(12) United States Patent
Guest et al.

(10) Patent No.: US 7,046,837 B2
(45) Date of Patent: May 16, 2006

(54) SYSTEM AND METHOD FOR LOCATING IRREGULAR EDGES IN IMAGE DATA

(75) Inventors: Clyde Maxwell Guest, Plano, TX (US); Chu-Yin Chang, Plano, TX (US)

(73) Assignee: August Technology Corp., Bloomington, MN (US)

( * ) Notice: Subject to any disclaimer, the term of this patent is extended or adjusted under 35 U.S.C. 154(b) by 261 days.

(21) Appl. No.: 10/224,919

(22) Filed: Aug. 21, 2002

(65) Prior Publication Data

US 2002/0191832 A1 Dec. 19, 2002

Related U.S. Application Data

(63) Continuation of application No. 09/592,641, filed on Jun. 13, 2000, now Pat. No. 6,459,807.

(51) Int. Cl.
*G06K 9/00* (2006.01)

(52) U.S. Cl. .................. 382/145; 382/199; 382/266

(58) Field of Classification Search ............. 382/190, 382/199, 251, 145, 266, 300, 173, 148, 141, 382/279, 293; 700/279, 95; 250/559.39, 250/559.4; 702/35; 356/237.1, 239.1, 394; 219/121.64
See application file for complete search history.

(56) References Cited

U.S. PATENT DOCUMENTS

| | | | |
|---|---|---|---|
| 4,645,459 A | 2/1987 | Graf et al. ................. 434/43 |
| 4,833,722 A | 5/1989 | Morton et al. .............. 382/22 |
| 4,860,371 A | 8/1989 | Matsuyama et al. ........... 382/8 |
| 5,012,524 A * | 4/1991 | Le Beau ................... 382/149 |
| 5,027,422 A | 6/1991 | Peregrim et al. ............. 382/48 |
| 5,081,689 A | 1/1992 | Meyer et al. ................ 382/22 |
| 5,164,994 A | 11/1992 | Bushroe ..................... 382/8 |
| 5,371,690 A * | 12/1994 | Engel et al. ............... 382/151 |
| 5,398,292 A | 3/1995 | Aoyama ..................... 382/22 |
| 5,627,912 A * | 5/1997 | Matsumoto ................. 382/146 |
| 5,754,678 A * | 5/1998 | Hawthorne et al. ......... 382/149 |
| 5,929,996 A * | 7/1999 | Itagaki et al. .............. 356/613 |
| 5,943,441 A | 8/1999 | Michael .................... 382/199 |
| 5,962,926 A | 10/1999 | Torres et al. .............. 257/786 |
| 6,096,567 A * | 8/2000 | Kaplan et al. .............. 438/14 |
| 6,252,985 B1 * | 6/2001 | Mitsunaga et al. ......... 382/199 |
| 6,356,300 B1 * | 3/2002 | Shiba ...................... 348/130 |
| 6,408,109 B1 * | 6/2002 | Silver et al. .............. 382/300 |
| 6,477,275 B1 * | 11/2002 | Melikian et al. ............ 382/217 |

OTHER PUBLICATIONS

PCT International Search Report for International Application No. PCT/US01/18528 dated Dec. 28, 2001.

* cited by examiner

*Primary Examiner*—Sheela Chawan
(74) *Attorney, Agent, or Firm*—Dicke, Billing & Czaja, PLLC (57) ABSTRACT

A system for processing image data, such as an image of a die cut from a silicon wafer, is provided. The system includes an irregular edge detection system, which can locate edge data of a feature of the image data, such as the edge of a probe mark in a bond pad. A feature area calculation system is connected to the irregular edge detection system, such as by accessing data stored by the irregular edge detection system. The feature area calculation system can receive the edge data of the feature and determining the area of the feature, such as by summing normalized pixel area values. The irregular edge detection system uses interpolation to locate edges that occur between the centerpoints of adjacent pixels.

19 Claims, 5 Drawing Sheets

SYSTEM AND METHOD FOR LOCATING IRREGULAR EDGES IN IMAGE DATA

CROSS-REFERENCE TO RELATED APPLICATIONS

This application is a continuation of U.S. application Ser. No. 09/592,641 filed on Jun. 13, 2000 now U.S. Pat. No. 6,459,807, which is incorporated by reference for all purposes.

FIELD OF THE INVENTION

The present invention pertains to the field of image data processing. More specifically, the invention relates to a system and method for locating irregular edges in image data that allows features having irregular edges to be detected.

BACKGROUND

Image data processing is used to inspect items during and after the manufacturing process. Such image data is typically gathered using a digital camera or other device that digitizes image data within the focal field of the device. The digitized image data is then analyzed, either manually or by software systems or other digital systems.

In cases where the image data is more complex, it is often necessary to manually review the image data before software systems can be used. For example, image data of dies that have been cut from a silicon wafer can be inspected by software systems. Nevertheless, areas of the die may have to be manually selected that cannot be analyzed by the software systems, such as areas that contain image data that will cause the software systems to register a false indication of a problem. In other circumstances, it is easier to select areas that are to be inspected, rather than areas that are to be excluded from inspection.

Therefore, although analysis of image data by software systems is useful, manual selection of image data may still be required. One area in which such manual selection can be required is the identification of probe marks on bond pads of a silicon wafer die. The irregular edges of a probe mark make probe marks difficult to detect, as opposed to straight edges between areas that differ in brightness. Thus, it is necessary to manually identify probe marks in order to determine whether the probe marks are closer to the edge or larger in area than may be allowed. Such manual detection is time consuming, and can also result in improper results. Nevertheless, known systems and methods for analyzing image data do not provide for any other way to identify such features having irregular edges.

SUMMARY OF THE INVENTION

In accordance with the present invention, a system and method for locating features in image data are provided that overcome known problems with locating features.

In particular, a system and method for locating features in image data are provided that allow irregularly shaped edges of features to be located.

In accordance with an exemplary embodiment of the present invention, a system for processing image data, such as an image of a die cut from a silicon wafer, is provided. The system includes an irregular edge detection system, which can locate edge data of a feature of the image data, such as the edge of a probe mark in a bond pad. A feature area calculation system is connected to the irregular edge detection system, such as by accessing data stored by the irregular edge detection system. The feature area calculation system can receive the edge data of the feature and determine the area of the feature, such as by summing normalized pixel area values. The irregular edge detection system uses interpolation to locate edges that occur between the centerpoints of adjacent pixels.

The present invention provides many important technical advantages. One important technical advantage of the present invention is a system and method for locating irregular edges in image data that can discriminate between random variations and anomalies and actual features of interest, such as probe marks. The present invention also provides for sub-pixel location of feature edges, and sub-pixel approximation of the area of features, both of which provide more accurate estimates of feature location and size than known systems and methods for locating and sizing features.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description which follows, like parts are marked throughout the specification and drawing with the same reference numerals, respectively. The drawing figures may not be to scale and certain components can be shown in generalized or schematic form and identified by commercial designations in the interest of clarity and conciseness.

Figure 1:
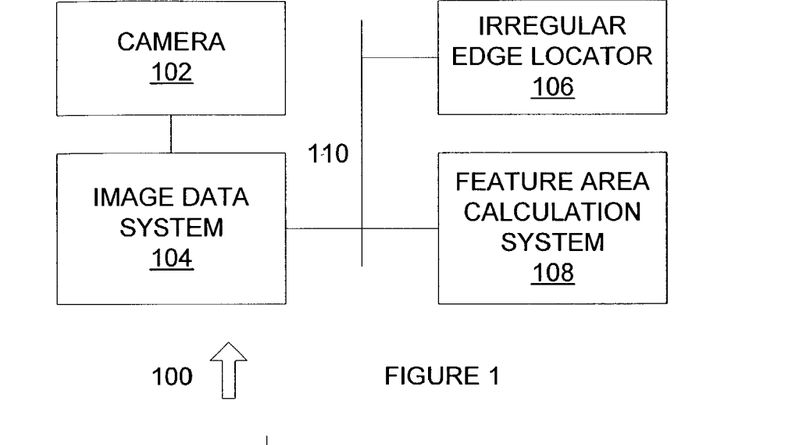
FIG. 1 is a diagram of a system for locating an irregular edge in image data in accordance with an exemplary embodiment of the present invention.

FIG. 1 is a diagram of a system 100 for locating an irregular edge in image data in accordance with an exemplary embodiment of the present invention. System 100 can be used to find features in image data that do not have straight edges.

System 100 includes camera 102. Camera 102 receives image data from a predetermined field, and converts the image data into digital data. In one exemplary embodiment, camera 102 generates a bitmap array of picture elements ("pixels") having a brightness value that ranges from 0 to 255. Camera 102 converts the image data into digital data according to a predetermined ratio. In this exemplary embodiment, camera 102 can convert a 5 mm.×5 mm. square field into a 1,000×1,000 pixel array, where each pixel thus has dimensions of 5×5 microns.

Image data system 104 is coupled to camera 102. As used herein, the term "coupled" and its cognate terms such as "couples" and "coupled" can refer to a physical connection (such as through a copper conductor), a virtual connection (such as through randomly assigned memory locations of a data memory device), a logical connection (such as through logical gates of a semiconducting device), a combination of such connections, or other suitable connections. In one exemplary embodiment, systems and components can be coupled to other systems and components through intervening systems and components.

Image data system 104 can be implemented in hardware, software, or a suitable combination of hardware and software, and can be one or more software systems operating on a general-purpose processor platform. As used herein, a software system can include one or more lines of code, one or more objects, one or more agents, one or more subroutines, one or more separate software programs, one or more separate lines of code in corresponding separate software programs, or other suitable structures of software. In one exemplary embodiment, a software system includes one or more lines of code in a general-purpose software program, such as an operating system, and one or more lines of code in a specific purpose software program. Image data system 104 receives the digital data from camera 102, converts the data into a suitable data format, and stores the data for subsequent use by other components of system 100.

System 100 includes irregular edge locator 106, which is coupled to image data system 104, such as through an operating system of a general-purpose computing platform. Irregular edge locator 106 can be implemented in hardware, software, or a suitable combination of hardware and software, and can be one or more software systems operating on a computing platform of a wafer inspection system that includes a processor or other suitable control system, such as the WAV 1000 wafer inspection system available from Semiconductor Technologies & Instruments of Plano, Tex. Irregular edge locator 106 receives image data from image data system 104 and locates irregular edges in the image data. In one exemplary embodiment, irregular edge locator analyzes rows of pixel data in predetermined bond pad areas and compares two adjacent rows to determine whether a variation region of brightness values exists. If the variation region of brightness values extends over a predetermined minimum interval, irregular edge locator 106 selects the area as requiring further analysis to determine whether an irregular edge is present.

In this exemplary embodiment, if a linear edge is encountered, then the difference in brightness values of two adjacent rows of pixels will be significant over the entire range of the pixels. Irregular edge locator 106 can exclude such linear edges to find "dips" or delta regions in the difference values between two adjacent rows of pixels, such that a localized area of pixel differences is identified. For example, a probe mark may have known maximum dimensions, such that edges having dimensions that exceed this maximum dimension can be excluded from further analysis. In order to prevent spurious indications, other predetermined criteria are also selected that prevent inadvertent identification of anomalies, noise, damage areas, or other irregularities as a potential irregular edge, such as a minimum size, minimum and maximum brightness variations, and other suitable criteria.

Irregular edge locator 106 also performs additional functions to verify the location of the irregular edge. In one exemplary embodiment, irregular edge locator 106 reads a third line of pixels and determines whether the "dip" or pixel brightness variation range for the third line is greater or lesser than the second line with respect to the first line. Such pixel brightness variation ranges in two or more adjacent rows of pixels indicate that the irregular edge has a location between the first pixel row and the second pixel row. If each pixel has a size that is greater than the size of an edge feature, then it can exist that an edge feature will lie between the center points of two adjacent pixels. Irregular edge locator 106 can determine the location of edge features that are in this configuration, such as by interpolating between the maximum brightness variations of two adjacent rows of pixels as compared to a third row of pixels having no brightness variations.

In one exemplary embodiment, camera 102 scans a 1,000×1,000 pixel image of a 5 mm.×5 mm. Square image field that contains one or more dies cut from a silicon wafer, such that each pixel has a dimension of 5 microns by 5 microns. The edge of an irregular feature, such as a probe mark, has an apparent width of approximately 1 micron in this exemplary embodiment, and lies between two rows of pixels at its most extreme edge. Irregular edge locator 106 provides data that allows the location of an irregular edge to be determined on a sub-pixel basis, such as by interpolating between the maximum brightness value variations measured between two adjacent rows of pixels. In this manner, irregular edge locator 106 provides sub-pixel resolution for edge detection.

System 100 includes feature area calculation system 108, which is coupled to irregular edge locator 106 and image data system 104. Feature area calculation system 108 can be implemented in hardware, software, or a suitable combination of hardware and software, and can be one or more software systems operating on a general purpose processor of a wafer inspection system. Feature area calculation system 108 calculates an estimated area of a feature having irregular edges. In one exemplary embodiment, feature area calculation system 108 is used to calculate the area of probe marks using data received from irregular edge locator 106 and image data system 104. In this exemplary embodiment, feature area calculation system 108 receives the coordinates of four or more points that bound a region which contains a probe mark or other feature having irregular edges from irregular edge locator 106. Feature area calculation system 108 then receives pixel data from image data system 104 for all pixels within the quadrilateral bounded by the coordinates received from irregular edge locator 106. Feature area calculation system 108 then sums the pixels received from image data system 104 in a predetermined manner to estimate an area for the feature contained within the quadrilateral identified by irregular edge locator 106.

In this exemplary embodiment, a variation in brightness value can be used to select between pixels that are exterior to the irregularly-edged feature (which may have a brightness value that is greater than a known or empirically-determined maximum brightness value) and pixels that are interior to the irregularly-edged feature (which may have a brightness value that is less than a known or empirically-determined minimum brightness value). Feature area calculation system 108 can scan each pixel within the quadrilateral bounded by the coordinates received from irregular edge locator 106, and can test each pixel against the criteria selected by the user. If a pixel has a brightness value that is less than a first predetermined value, then that pixel is included in the area calculation. Likewise, if the pixel has a brightness value that is greater than a second predetermined brightness value, the area of that pixel is excluded from the area calculation for the irregular feature. If the pixel has a value that falls between the minimum and maximum range, then interpolation or other suitable methods are used to determine a pro-rata area that approximates the area of the pixel that is within the irregular feature.

In operation, system 100 is used to locate irregular features and to calculate the area of the irregular feature. System 100 first uses a modified edge detect method to find features having irregular edges that do not extend for a significant number of pixels. System 100 further allows interpolative or sub-pixel techniques to be used to identify irregular edges that fall between the center points of two adjacent pixels. System 100 then identifies a quadrilateral region or other suitable region bounded by the irregular edge coordinates, and performs a pixel-by-pixel summation of the area of the irregular feature, using user-entered or other predetermined brightness values for minimum and maximum ranges for the brightness values of the irregular feature. In this manner, system 100 uses a sub-pixel technique for identification of edge coordinates for irregular features, such as probe marks, and a sub-pixel technique for calculation of the area of such features.

Figure 2:
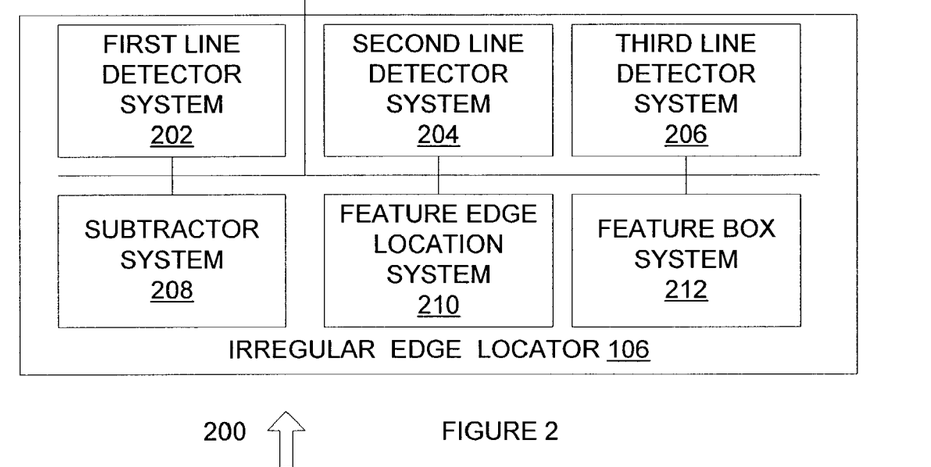
FIG. 2 is a diagram of a system for locating irregular edges in accordance with an exemplary embodiment of the present invention.

FIG. 2 is a diagram of a system 200 for locating irregular edges in accordance with an exemplary embodiment of the present invention. System 200 includes irregular edge locator 106 and other system functionality that allows features having irregular edges to be located.

System 200 includes first line detector system 202, second line detector system 204, third line detector system 206, subtractor system 208, feature edge location system 210, and feature box system 212, each of which can be implemented in hardware, software, or a suitable combination of hardware and software, and which can be one or more software systems operating on a general purpose processor of a wafer inspection system. First line detector system 202 can read brightness data for each pixel of a first line of pixels. For example, first line detector system 202 can read pixels that lie linearly along a row of an N×M pixel matrix, pixels that lie linearly along a column of the N×M pixel matrix, or pixels that lie linearly at an angle to the rows and columns of the N×M pixel matrix. In one exemplary embodiment, first line detector system 202 can determine a line lying parallel to an edge of an octangular bond pad or other suitable structures.

Second line detector system 204 receives pixel data from a suitable digital data device and can select a line of pixel brightness values for use in conjunction with the first line detector system 202. In one exemplary embodiment, second line detector system 204 detects a line of pixels that is physically adjacent to the line of pixels detected by first line detector system 202. Second line detector system 204 can likewise locate lines that lie parallel to an edge of an octangular bond pad or other suitable features.

Third line detector system 206 performs functions similar to first line detector system 202 and second line detector system 204, but with a third line that lies adjacent to the pixels selected for second line detector system 204. Third line detector system 206 is used to locate irregular edges that lie between the centerpoints of the pixels, such as by allowing the brightness difference between the pixels measured by first line detector system 202 and second line detector system 204 to be interpolated with the brightness difference between the pixels measured by first line detector system 202 and third line detector system 206.

Subtractor system 208 receives the pixel data from first line detector system 202, second line detector system 204, and third line detector system 206, and analyzes the pixel brightness data to generate difference data, and to locate areas in which the brightness values for adjacent lines of pixels differ by more than a predetermined value. For example, variations in brightness values for adjacent pixels may typically vary by predetermined expected noise value for random variations. Subtractor system 208 can compare a range of pixels that are adjacent to determine whether each of the pixels within that range varies by more than the predetermined noise value, and whether such variations are indicative of an irregular edge.

Feature edge location system 210 receives the difference data from subtracter system 208 and determines whether a feature edge has been located. In one exemplary embodiment, feature edge location system 210 compares the data received from subtracter system 208 to predetermined criteria for differences in brightness values, coordinate lengths, and other suitable data. Feature edge location system 210 can also determine whether the variation between the brightness values of the first line and second line pixels falls within a predetermined form, such as a "dip," wherein the absolute magnitude of the difference in brightness values first increases, then reaches a maximum, and then decreases back to zero. Feature edge location system 210 also compares the third line of pixels with the first line of pixels, so as to allow interpolation between adjacent "dips" or other suitable functions.

For example, feature edge location system 210 can receive difference data from subtracter system 208 for pixel brightness values received from the second line detector system 204 and the corresponding adjacent pixel brightness values received from first line detector system 202, and can also receive difference data for pixel brightness values received from third line detector system 206 and the corresponding adjacent pixel brightness values received from first line detector system 202. The sub-pixel location of the irregular edge of the feature can then be determined by the difference between the second line pixel values and the third line pixel values divided by the difference between the first line pixel values and the third line pixel values in accordance with the following equation:

D3=normalized distance of feature edge from D2

D2+D3 to D3 where

D2=maximum brightness difference between pixel line 1 and pixel line 2

D3=maximum brightness difference between pixel line 1 and pixel line 3

Feature box system 212 receives edge coordinate data for irregular edges from feature edge location system 210 and interacts with image data system 104 to receive pixel brightness data for the pixels contained within a quadrilateral bounded by the edge coordinates determined by feature edge location system 210. When feature edge location system 210 retrieves more than four points of edge data, feature box system 212 can further determine a suitable bounding perimeter region for the irregular feature, such as a probe mark, so as to allow the area of the feature to be determined in addition to its approximate coordinate values.

In operation, system 200 is used to analyze digital data to locate edges of irregular features. Unlike features having linear edges, features having irregular edges will not result in variations between adjacent rows of pixels that are uniformly different and significant. Thus, additional analysis must be performed to locate areas within the two adjacent lines of pixels that are greater than predetermined areas. System 200 performs this and other suitable functions to locate irregular edges.

Figure 3:
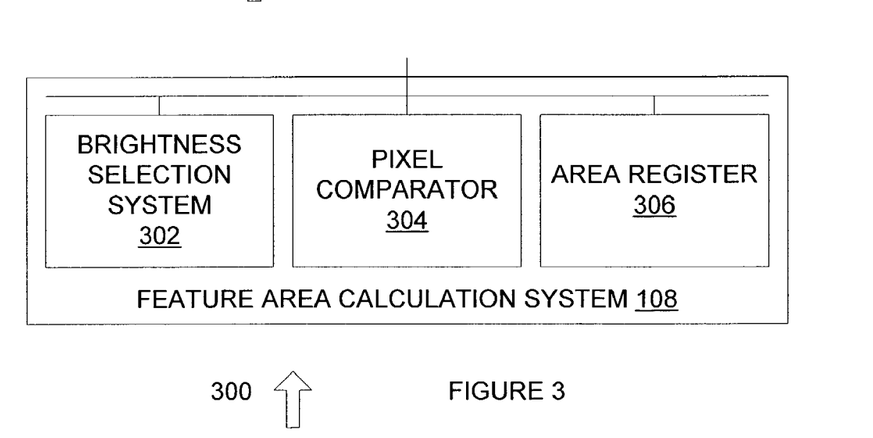
FIG. 3 is a diagram of a system for calculating the area of an irregular feature in accordance with an exemplary embodiment of the present invention.

FIG. 3 is a diagram of a system 300 for calculating the area of an irregular feature in accordance with an exemplary embodiment of the present invention. System 300 includes feature area calculation system 108 and sub-pixel area calculation functionality that provides greater accuracy for the calculation of the area of image features having irregular edges.

System 300 includes brightness selection system 302, pixel comparator 304, and area register 306, which can be implemented in hardware, software, or a suitable combination of hardware and software, and which can be one or more software systems operating on a processor or control system of a wafer inspection system. Brightness selection system 302 is used to select a range over which brightness values can vary such that they are indicative of sub-pixel edge locations for features having irregular edges. For example, it can be determined that a feature having irregular edges, such as a probe mark, has a brightness less than a minimum threshold. Likewise, it can also he determined that the brightness value for pixels lying outside of such irregularly-edged features will always be greater than a predetermined value. Thus, if the brightness value of a pixel falls within a range of predetermined minimum and maximum values, this indicates that the edge of the irregular feature passes through the pixel, and that the pixel is not contained wholly within or exterior to the irregular edge. Brightness selection system 302 can determine the minimum and maximum values, such as by receiving user-selected values, by analyzing probe mark or irregular feature pixel values, or by other suitable procedures.

Pixel comparator 304 receives pixel brightness data and determines whether the pixel brightness data falls below, within, or above the range of brightness values determined by brightness selection system 302. Pixel comparator 304 is further operable to perform sub-pixel area calculations by approximating the area of the pixel based upon the brightness value when it falls within the predetermined minimum and maximum range.

Area register 306 is coupled to pixel comparator 304 and receives pixel area calculation data and sums the pixel area calculation data to determine the approximate area of a feature having irregular edges. For example, pixel comparator 304 can transmit data to area register 306 for a pixel that indicates that the pixel is wholly exterior to the irregular feature. In this exemplary embodiment, the pixel will be given a normalized area value of 0.0. Likewise, if pixel comparator 304 transmits data to area register 306 that indicates that the pixel is contained entirely within the irregularly edged feature, then the area of the pixel can be designated as having a normalized value of 1.0. Subsequent conversion of the normalized pixel area is performed by area register 306 or other suitable systems.

Likewise, pixel comparator 304 can calculate a fractional sub-pixel area, based on a normalized scale from 0.0 to 1.0, and can transmit the normalized fractional pixel area to area register 306. In this manner, area register 306 receives pixel area data from pixel comparator 304 for each of the pixels within the region that bounds the area that contains the irregular feature, and sums the pixel area to calculate the area of the irregularly-shaped feature.

In operation, system 300 is used to calculate the area of an irregularly shaped feature based upon pixel brightness values. System 300 uses sub-pixel interpolation to approximate the area of pixels that have brightness values that range between a minimum value associated with the feature and a maximum value associated with an undamaged area. In this manner, system 300 allows increased sensitivity of area calculations for irregularly shaped features.

Figure 4:
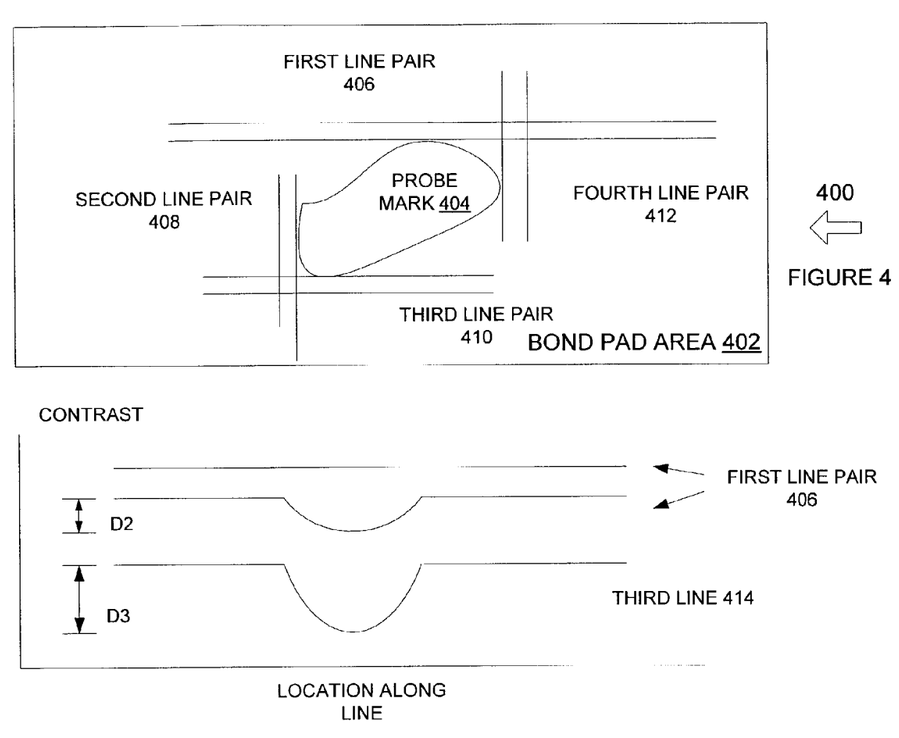
FIG. 4 is a diagram of a probe mark in a bond pad in accordance with an exemplary embodiment of the present invention.

FIG. 4 is a diagram 400 of a probe mark 404 in a bond pad area 402 in accordance with an exemplary embodiment of the present invention. Diagram 400 shows a probe mark 404 within a bond pad area 402 and exemplary lines of pixel brightness data that are used to detect irregularly shaped edges of the probe mark 404.

Bond pad area 402 is a pre-selected bond pad region, such as a bond pad area that has been selected by a self-teaching system, or by operator identification of bond pad areas. Probe mark 404 is formed within bond pad area 402 by a probe that is used to test the integrated circuit that is associated with the bond pad area 402 for functionality. Pixels that define probe mark 404 thus will have a brightness value under a uniform lighting field that differs from the brightness values for pixels that define bond pad area 402, as the probe mark 404 is a portion of the bond pad area 402 that has been indented by the probe.

Adjacent to probe mark 404 are first line set 406, second line set 408, third line set 410, and fourth line set 412. Each line set consists of an exterior line that is not adjacent to the probe mark 404, a middle line, and an interior line that touches the edge of the probe mark 404. Thus, if three adjacent lines of pixels are scanned starting with the top left-hand edge bottom and right-hand edge of bond pad area 402, then the brightness values for each adjacent pixel can be compared as is shown in the graph of diagram 400.

For example, three exemplary lines are shown for first line set 406. The exterior line of first line set 406 shows a fixed brightness value as the location along the line varies, whereas the middle line of the first line set 406 shows a dip at a location corresponding to the approximate location of the edge of probe mark 404. Thus, the distance "D2" which corresponds to the "dip" of the middle line can be used to determine whether the coordinates corresponding to the location of the dip indicate the irregular edge of probe mark 404.

Likewise, if the center points of the pixels that form the middle line of first line set 406 do not lie on top of the irregular edge of probe mark 404, then the interior line that falls on the other side of the irregular edge of probe mark 404 can be used to locate the approximate location of the irregular edge relative to the centers of the pixels in the second line and the third line. As shown in FIG. 4, the chart of the pixel brightness values for the interior line has a greater distance D3 of "dip" as compared to the dip "D2" of the middle line of first line set 406. Thus, D2 and D3 can be used to interpolate the location of the irregular edge of probe mark 404.

In operation, the structure shown in diagram 400 is used to identify the coordinates of an irregular edge of a feature, such as a probe mark, based upon "dip" values and adjacent lines of pixel brightness values. Likewise, diagram 400 shows an exemplary embodiment by which sub-pixel edges can be identified.

Figure 5:
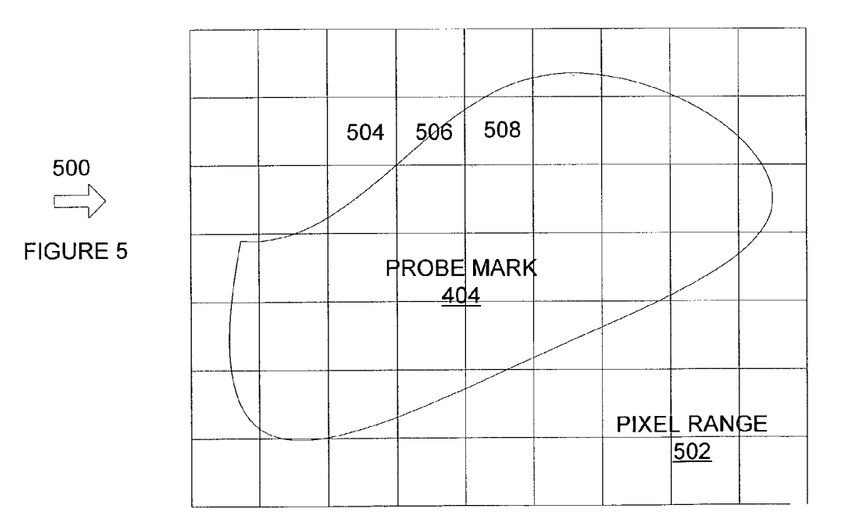
FIG. 5 is a diagram of a pixel map in accordance with an exemplary embodiment of the present invention.

FIG. 5 is a diagram of a pixel map 500 in accordance with an exemplary embodiment of the present invention. Pixel map 500 includes pixels falling within a coordinate range that bounds probe mark 404.

Pixel range 502 is a seven-by-nine pixel matrix that contains probe mark 404. As shown in FIG. 5, the pixels within probe mark 404 are darker and have a lower brightness value than the pixels exterior to probe mark 404. Thus, the area of probe mark 404 can be determined by assigning a normalized area to each pixel based upon the brightness value of that pixel, summing the normalized areas of pixels, and converting the normalized pixel area into an actual area determined from the number of pixels per unit area of the field of view of the camera or other digital imaging device.

Pixels 502, 504, and 506 demonstrate one approach by which each of the pixels of probe mark 404 can be summed to determine the approximate area of probe mark 404. Pixel 502 falls entirely outside of probe mark 404, and thus has a brightness value greater than the maximum range for pixels that may fall within probe mark 404. The area associated with pixel 502 is thus set to 0.0. Likewise, pixel 504 has a brightness value that falls between the minimum and maximum range, as the irregular edge of probe mark 404 approximately bisects pixel 504. Thus, the area contained within pixel 504 from probe mark 404 can be estimated by interpolating between the minimum and maximum brightness values. Likewise, pixel 506 is contained almost entirely within probe mark 404, and thus would either be close to or below the minimum brightness value. Thus, the area of pixel 506 would either be set to 1.0 or interpolated to a value very close to 1.0.

In operation, the area of each pixel contained within probe mark 404 is set to a normalized value of 1.0, and a normalized area is interpolated for pixels that are bisected or for which only a portion is contained within probe mark 404. In this manner, sub-pixel area is used to approximate the area of probe mark 404, which provides a better estimate of the area probe mark 404 than systems and methods that use normalized values of 0.0 and 1.0 with no interpolation.

Figure 6:
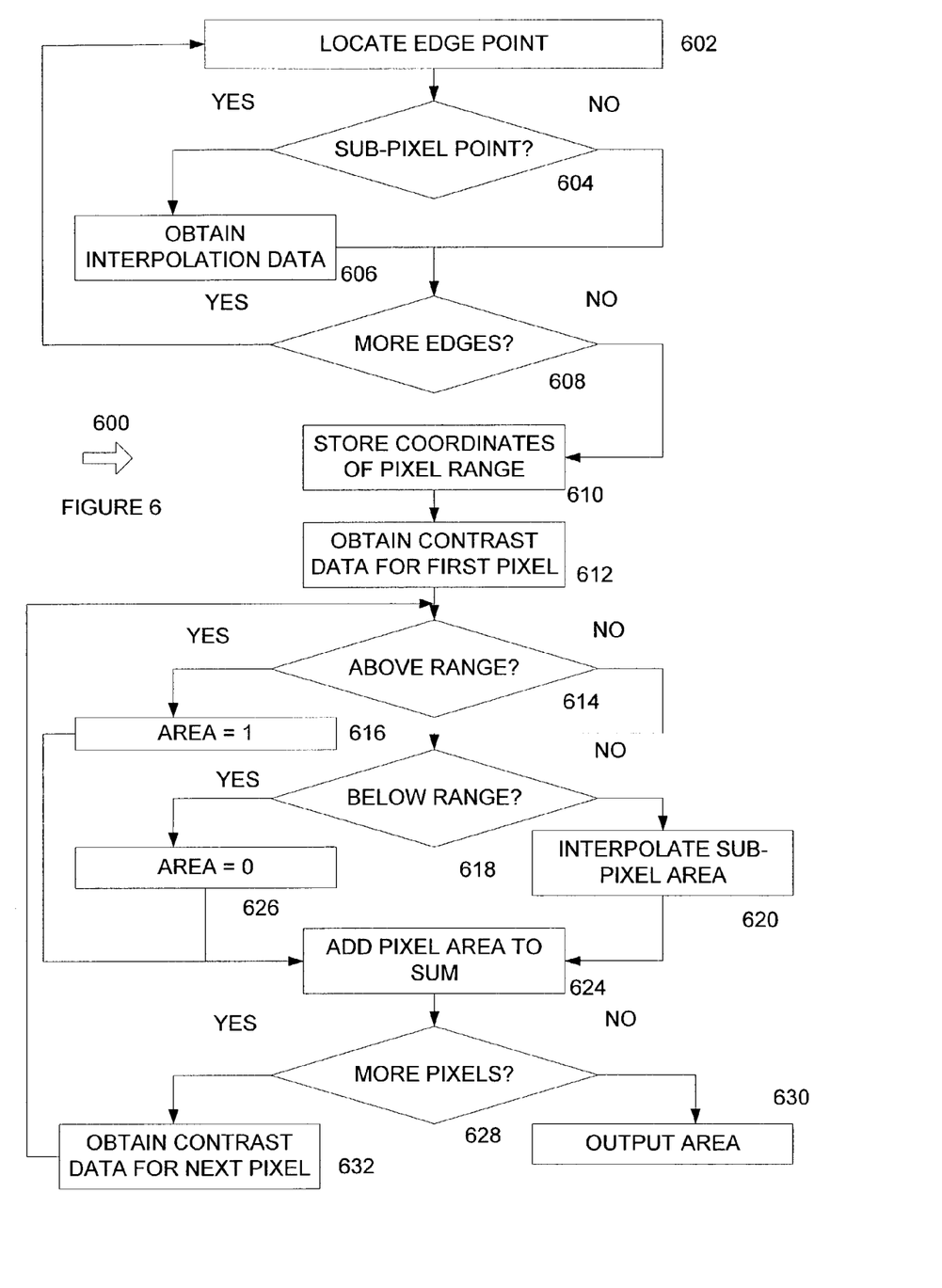
FIG. 6 is a flow chart of a method for processing image data to identify irregular edges and to approximate the area of features having irregular edges in accordance with an exemplary embodiment of the present invention.

FIG. 6 is a flow chart of a method 600 for processing image data to identify irregular edges and to approximate the area of features having irregular edges in accordance with an exemplary embodiment of the present invention. Method 600 begins at 602 where an edge point is located. For example, an edge point can be located by comparing two adjacent rows of pixel brightness data to identify a dip region having predetermined minimum dimensions. Likewise, if the difference in brightness values extends for a length that is greater than an empirically-determined or user-entered length for a probe mark or other feature, then this length indicates that the edge is a straight edge and not an irregular edge. The method then proceeds to 604.

At 604, it is determined whether a sub-pixel point has been identified. For example, an additional pixel brightness line can be read and it can be determined whether the third line has pixel brightness values that are lower than those of the middle line of pixel brightness values. If it is determined at 604 that a sub-pixel location is not being analyzed, then the method proceeds to 608. Otherwise, the method proceeds to 606 where interpolation is performed. The method then proceeds to 608.

At 608, it is determined whether additional edges need to be located. For example, edges can be located starting from the exterior edge of a known feature, such as a bond pad, and then sweeping inward until the opposite edge of the bond pad or other known feature is encountered. If it is determined at 608 that more edges need to be determined, the method returns to 602 and a scan is initiated from a different edge. Otherwise, the method proceeds to 610.

At 610, the coordinates of the pixel range are stored, such as to identify a quadrilateral region of pixels that describes an N×M pixel range. The method then proceeds to 612. At 612, brightness data for the first pixel within the N×M pixel range is retrieved. The method then proceeds to 614 where it is determined whether the brightness value of the pixel is above the predetermined range. If it is determined at 614 that the brightness is above the range, the method proceeds to 616 where the normalized area of the pixel is set to 0.0. Otherwise, the method proceeds to 618.

At 618, it is determined whether the brightness data for the pixel is below the predetermined range. If it is determined that the brightness data of the pixel is below the range, the method proceeds to 626 where the normalized area is set to 1.0. The method then proceeds to 624. Otherwise, the method proceeds to 620 where a sub-pixel area is interpolated, as the brightness value of the pixel necessarily falls between the minimum and maximum pixel brightness range. The method then proceeds to 624.

At 624, the pixel area determined for the current pixel is added to the sum of pixel data and the method proceeds to 628. At 628, it is determined whether there are additional pixels contained within the N×M pixel range. If it is determined that there are more pixels, the method proceeds to 632 where brightness data for the next pixel in order is determined. The method then returns to 614. Otherwise, the method proceeds to 630 where the area for the irregular feature is output.

In operation, method 600 is used to calculate an approximate area for an irregularly shaped feature, where the edge of the irregularly shaped feature can intersect or cut through fractional areas of pixels. Method 600 thus allows sub-pixel techniques to be used to provide a better approximation of area than techniques that do not utilize sub-pixel approximation.

Figure 7:
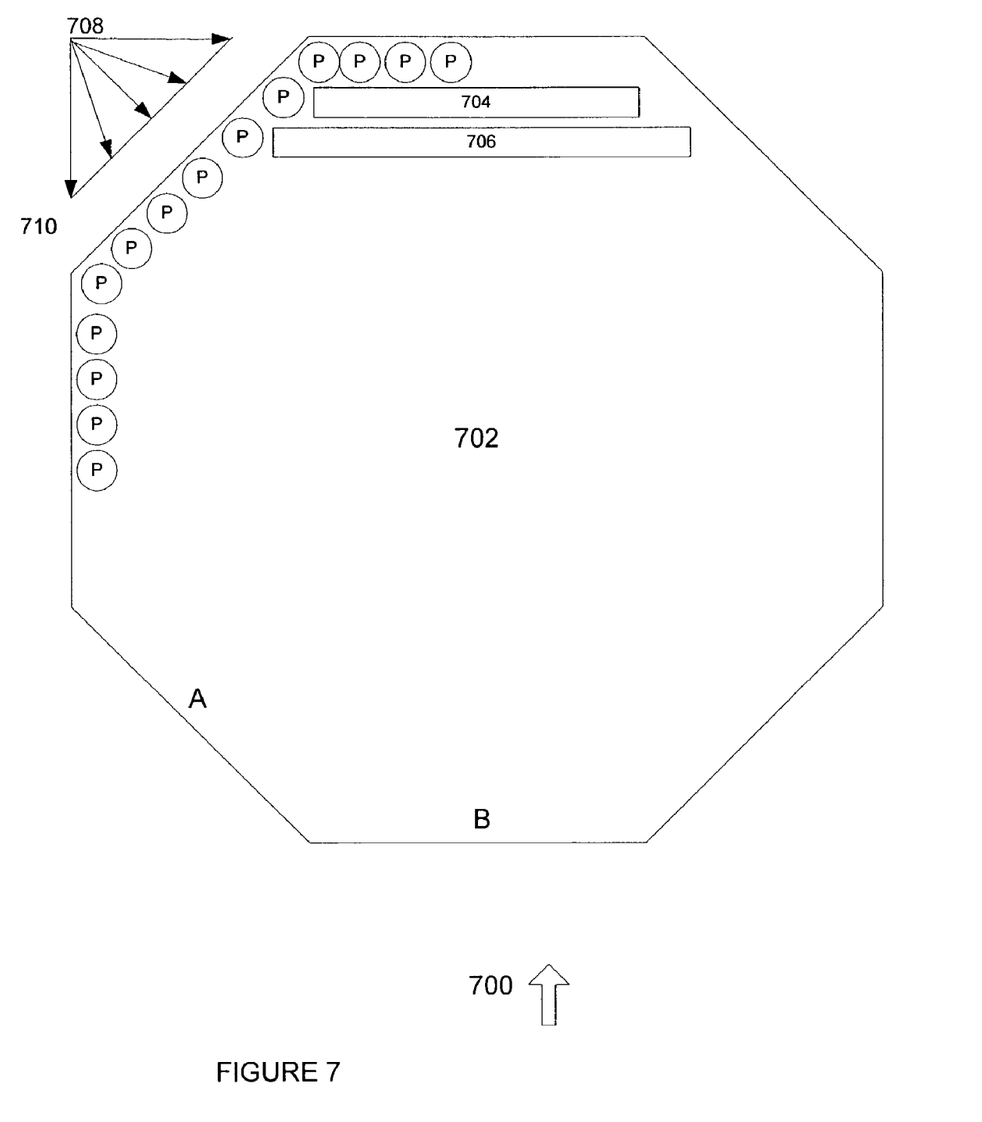
FIG. 7 is a diagram of an octagonal bond pad that demonstrates exemplary features of the present invention.

FIG. 7 is a diagram of an octagonal bond pad 700 that demonstrates exemplary features of the present invention. Octagonal bond pad 702 includes dimensions A and B where dimension A is the length of the angled edge of the octagon and dimension B is the length of the section of the octagon 702 that lies along the X and Y axis. The exterior edge of 702 can be determined using a model or reference image, and a first layer of pixels identified as P in FIG. 700 are used to identify an edge region that lies immediately within the exterior edge.

After the exterior edge and edge region of octagonal bond pad 702 has been identified, the remaining pixels contained within bond pad 702 are then analyzed, such as pixels contained within rows 704 and 706, to determine whether the probe mark or other feature is contained within the edge region. If it is determined that the probe mark does exist within the edge region, then the previously described methods are used to determine the coordinates that bound the probe mark. Otherwise, it may be necessary to determine whether the probe mark extends into the edge region indicated by pixels "P". In this case, line 710 of pixels that are parallel to the edge of the octangular region A of octangular bond pad 702 are selected using the ratio of A to B and point 708, which is the point that would be at the corner of octagon if the side of the octagon that lie along the X and Y axes were extended until they touched. These adjacent lines are then analyzed in a similar manner so as to locate dips and the potential edges of irregularly shaped features.

In operation, octangular bond pads can be analyzed to locate irregularly shaped features such as probe marks, with the addition of several steps. After selection of a region contained within the octangular bond pad, it is then determined whether the probe mark or other irregular feature may lie within an edge region. If it is determined that such probe mark or other feature lies within the edge region, additional analysis can be performed using the calculation of pixel rows that lie parallel to the angular portion of the octangular bond pad 702.

Figure 8:
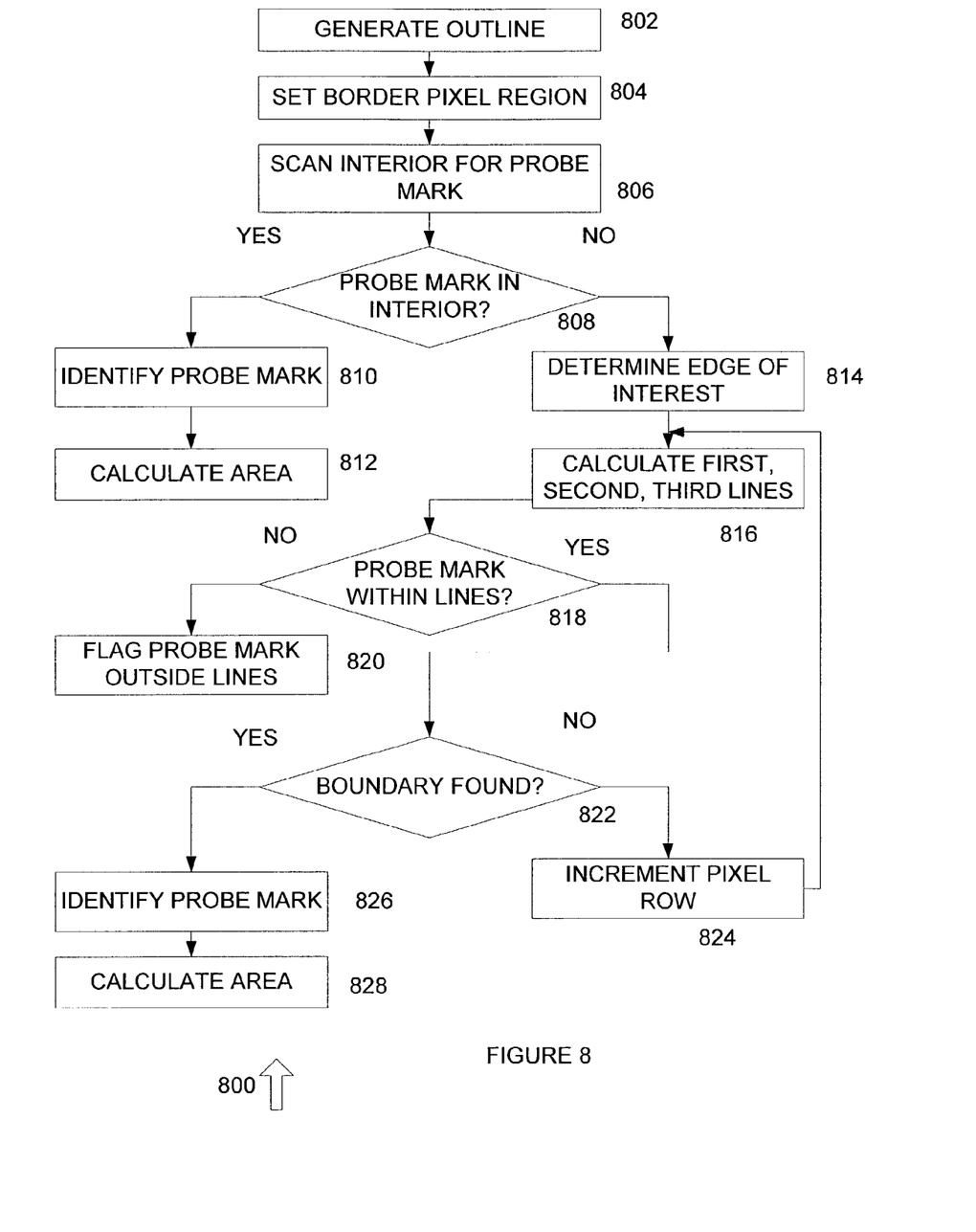
FIG. 8 is a flow chart of a method for analyzing octangular bond pads to locate irregularly shaped features in accordance with an exemplary embodiment of the present invention.

FIG. 8 is a flow chart of a method 800 for analyzing octangular bond pads to locate irregularly shaped features in accordance with an exemplary embodiment of the present invention. Method 800 begins at step 802 where an outline is generated, such as by scanning a reference image of an octangular bond pad. The method then proceeds to 804 where the border pixel region is set. For example, the border pixel region can be selected based upon expected locations of pixels relative to the outline received at 800. The method then proceeds to 806 where the interior of the octangular bond pad is scanned for probe marks or other irregular features. The method then proceeds to 808.

At 808, it is determined whether a probe mark has been located within the interior region of the octangular bond pad. If it is determined that a probe mark has been found, the method proceeds to 810 where the coordinate boundaries for the probe mark are identified. The method then proceeds to 812 where the area of the probe mark is calculated.

If it is determined at 808 that the probe mark is not contained within the interior of the octangular bond pad, then the method proceeds to 814 where the edge of interest for additional analysis is determined. For example, based upon other coordinates of the probe mark, it can be determined that the fourth or unknown edge must lie within a certain portion of the border region of the octangular bond pad. After this edge of interest is determined, the method proceeds to 816 where the coordinates of first, second, and third lines are calculated. For example, the first, second, and third lines are to be used for analysis can be calculated based upon known or user-entered dimensions of straight and angular portions of the octangular bond pad and the approximated corner point of the octangular bond pad. After calculation of the lines, the method proceeds to 818.

At 818, it is determined whether the edge of the probe mark or other irregular feature lies within the lines. If it is determined that it does not, the method proceeds to 820 and the probe mark is flagged as being outside the lines. Otherwise, the method proceeds to 822 where it is determined whether a boundary has been found. If a boundary has not been found, the method proceeds to 824 and the pixel row is incremented by one. The method then returns to 816. Otherwise, the method proceeds to 826 where the probe mark is identified. The method then proceeds to 828 where the area of the irregular feature is calculated based upon the coordinates of the edges.

In operation, method 800 can be used to analyze an octangular bond pad to locate irregular features such as probe marks, to identify the coordinates of the edges of such irregular features, and to further identify the approximate area of such irregular features. In this manner, probe marks and other irregular features can be analyzed for non-rectangular bond pads, such as for octangular bond pads or bond pads having other areas.

Although preferred and exemplary embodiments of a system and method for locating irregular edges in image data have been described in detail herein, those skilled in the art will also recognize that various substitutions and modifications can be made to the systems and methods without departing from the scope and spirit of the appended claims.

The invention claimed is:

1. A system for inspecting components comprising:
    an irregular edge detection system receiving image data and generating feature pixel data by assigning a brightness value to regular and irregular features in the image data;
    a feature edge location system receiving the feature pixel data and generating sub-pixel edge data; and
    a feature area calculation system receiving the sub-pixel edge data and generating feature area data using the sub-pixel edge data.

2. The system of claim 1 wherein the feature area calculation system further comprises a contrast selection receiving the feature pixel data and generating sub-pixel range data.

3. The system of claim 1 wherein the feature area calculation system further comprises a pixel comparator system receiving the feature pixel data and generating pixel area data.

4. The system of claim 1 wherein the feature area calculation system further comprises an area register receiving the feature pixel data and generating feature area data.

5. The system of claim 1 wherein the feature area calculation system further comprises an area register receiving the feature pixel data and generating probe mark area data.

6. The system of claim 1 wherein the irregular edge detection system further comprises a feature box system receiving the feature pixel data and generating feature box data.

7. The system of claim 1 wherein the brightness value is a variation in brightness between pixels in the image data.

8. The system of claim 1 wherein the feature pixel data includes a first brightness value assigned to a pixel within the feature and a second brightness value assigned to a pixel outside the feature.

9. A system for inspecting components comprising:
    a brightness contrast selection system receiving image data and generating sub-pixel range data for regular and irregular features;
    a pixel comparator receiving the sub-pixel range data and pixel data and generating sub-pixel edge data; and
    an area register receiving the image data and generating feature area data.

10. The system of claim 9 wherein the sub-pixel edge data further comprises sub-pixel area data.

11. The system of claim 9 further comprising an area register receiving the image data and generating probe mark area data.

12. A method for inspecting components comprising:
    receiving a plurality of pixels of image data;
    determining a first brightness value of a pixel within a feature;
    determining a second brightness value of a pixel outside of the feature;
    identifying an edge pixel wherein an edge lies within an area bounded by the edge pixel; and
    generating area data that is less than an area bounded by a standard pixel.

13. The method of claim 12 further comprising using the sub-pixel edge data to calculate feature area data.

14. The method of claim 12 wherein generating sub-pixel edge data comprises generating edge coordinate data.

15. The method of claim 12 wherein identifying the edge pixel comprises:
    identifying a pixel as the edge pixel if the brightness of the pixel is between the first brightness value and the second brightness value.

16. The method of claim 12 wherein generating area data comprises:
  generating area data based on the first brightness value and the second brightness value.

17. The method of claim 16 wherein generating the area data based on the first brightness value and the second brightness value comprises:
  assigning a normalized area of 1.0 to the first brightness value;
  assigning a normalized area of 0.0 to the second brightness value; and
  assigning a normalized area to the edge pixel based on the ratio of the difference between the edge pixel brightness and the second brightness value to the difference between the first brightness value and the second brightness value.

18. The method of claim 12 further comprising using the sub-pixel edge data to calculate probe mark area data.

19. The method of claim 12 wherein identifying the edge pixel wherein the edge lies within the area bounded by the edge pixel comprises:
  determining a pixel brightness variation $D2$ of a first row of pixels;
  determining a pixel brightness variation $D3$ of a second row of pixels; and
  identifying the edge pixel as the pixel where $D3$ is greater than $D2$.

* * * * *